April 22, 1958 G. K. C. HARDESTY 2,831,453
ILLUMINATED PANEL, DIAL AND/OR POINTER BY
GEOMETRICAL SURFACES
Filed July 26, 1956 2 Sheets-Sheet 1

INVENTOR
George K. C. Hardesty
BY George Sipkin
B. L. Zangwill
ATTORNEYS

April 22, 1958 G. K. C. HARDESTY 2,831,453
ILLUMINATED PANEL, DIAL AND/OR POINTER BY
GEOMETRICAL SURFACES
Filed July 26, 1956 2 Sheets-Sheet 2

INVENTOR
George K.C. Hardesty

BY
*George Sipkin*
*B. L. Zangwill*
ATTORNEYS

2,831,453

ILLUMINATED PANEL, DIAL AND/OR POINTER BY GEOMETRICAL SURFACES

George K. C. Hardesty, Mayo, Md.

Application July 26, 1956, Serial No. 600,356

19 Claims. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

The invention disclosed in this application is related to the inventions disclosed in each of applicant's copending applications Serial No. 369,976, filed July 23, 1953, for Duo-Panel Edge Illumination System, Serial No. 564,090, filed February 2, 1956, for Laminated Metal-Plastic Illuminable Panels, and Serial No. 600,355, now U. S. Patent 2,805,505, filed July 26, 1956, concurrently herewith, for Illuminated Panel-Uninterrupted Translucent Lamination.

The present invention relates to the illumination of instrument dials, panels and pointers; more particularly, to the provision of efficient edge-illuminated dials; panels and pointers that are suited for many uses aboard ships and aircraft, and in other installations having a large number of visual indicators.

For military applications, the interest seems to lie almost entirely in the edge illumination of transparent plastics. However, most of the edge-illuminated structures are inefficient. The degree of efficiency varies widely; and, in some applications, only the most efficient are of any practical value. In some applications, such as in the illuminated control panels of aircraft, there has been much patience with the inherent limitations or rather the inherent inefficiencies of the structures that have been developed, and the designer can utilize such structures only by using a large number of lamps per unit of illuminated panel area.

In applicant's copending application, Serial No. 369,-976, filed July 23, 1953, for Duo-Panel Edge Illumination System, referred to above, there is described an invention which has for its object the provision of an improved panel edge illumination system that is particularly suitable in locations in which the preservation of a high degree of dark adaptation of personnel is required. In that application there is described a system which operates on the principle of transmission of light through a transparent plastic sheet by total internal reflection to a second indicia-bearing sheet which is in poor optical contact with the surfaces of the first sheet. This provides an extremely efficient system since little or no light is lost. While the duo-panel system disclosed in applicant's copending application is extremely efficient, the illuminating field is broad, and in some installations for one reason or another, such as cost of fabrication, need for relatively low first cost or the like, the duo-panel system would not be the optimum choice and there was need for alternate means for illuminating instrument panels.

In applicant's copending application Serial No. 564,-090, referred to above, there is provided an improved panel illumination system wherein polished, metallic surfaces are optically bonded to the surfaces of an edge-illuminable plastic sheet or panel and light is transmitted by reflection between the polished metallic boundaries thus formed. This is in direct contradistinction to the principle of providing poor optical contact and thereby obtaining total internal reflection described in applicant's earlier copending application. However, while the coefficient of reflection of a polished metallic surface may be much less than that of total internal reflection, it is nearly the same for any angle of incidence. Accordingly, provision was made for salvaging, collimating and reflecting to the object to be illuminated, light rays having an angle of direction greater than the complement of the critical angle of the transmitting medium. The combined effect of this is to increase the total solid angle of light that may be utilized thereby increasing the efficiency of the new system.

It will be noted that there is a similarity between applicant's two prior cases in that the light transmission is in both instances by specular reflection. However, there is a difference in that the specular reflection in the latter instance is the phenomenon of light reflection from a polished metallic surface; while, in the former the reflection is that termed "total internal reflection" and is a phenomenon associated with the difference between the indices of refraction of two transparent media separated by a common interface.

The invention disclosed in Serial No. 600,355, now U. S. Patent 2,805,505, referred to above, follows the phenomenon of light reflection of polished metallic surfaces, of applicant's above copending application Serial No. 564,090, while incorporating therewith certain desirable features of applicant's copending application Serial No. 369,976.

Briefly, with applicant's concurrently filed application, Serial No. 600,355, now U. S. Patent 2,805,505, a transparent, light-transmitting panel is laminated on all surfaces first with a polished metal having high specular reflectively, then with a translucent material and then with an opaque material. Each such lamination is continuous and uninterrupted except for predetermined, juxtaposed light-transmitting openings in the metallic and opaque laminations, certain of which openings are for the transmission of light from a lamp into the transparent panel and other of which openings are to provide indicia or other markings on the obverse face of the panel; the indicia being formed by bringing integral portions of the translucent lamination into optical contact with the transparent panel through the indicia-forming openings in the obverse face of the metallic lamination. In this manner the brightness of the indicia is enhanced and the metallic lamination is sealed against corrosive atmospheres.

The instant invention follows generally the teaching of application Serial No. 600,355, now U. S. Patent 2,805,-505, with the additional improvement of using oriented geometric, specular reflective surfaces for enhacing the brightness of indicia or other markings on panels, dials, knobs and/or pointers.

A general object of the present invention is the provision of an improved panel illumination system.

Another object of this invention is to enhance the brightness of indicia or other markings on an illuminated panel.

A further object of this invention is to control the brightness of indicia or other markings on an illuminated panel.

A further object of this invention is to seal a specular reflective metallic coating of an illuminating panel from exposure to salt sprays, corrosive atmospheres or the like.

A further object of this invention is the provision of an improved knob illumination system.

A still further object of this invention is to provide an improved illuminating system for dials and/or pointers.

Other objects and many of the attendant advantages of the invention will be readily appreciated as the same becomes better understood by reference to the following detailed description when considered in connection with the accompanying drawings in which like reference numerals designate like parts throughout the several views thereof and wherein.

Figure 1:
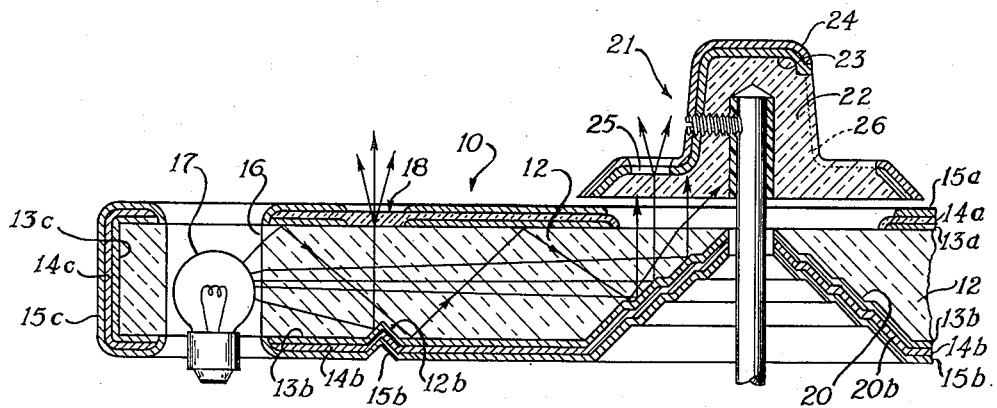
Fig. 1 is a fragmentary section through an illuminated panel and control knob, illustrating a preferred embodiment of the invention.

Referring now to Fig. 1 of the drawings wherein for purposes of illustration the invention is shown applied to a fragment of an edge-illuminated panel particularly adapted for use aboard ships, aircraft or the like. The structure designated generally by reference numeral 10, includes a panel or light-transmitting member 12 made of a highly transparent plastic. The light-transmitting panel comprises a relatively large flat highly transparent plate, having its front and back surfaces in parallel relation to each other and preferably polished to provide smooth optical surfaces. The light-transmitting panel is preferably fabricated from an acrylic resin or methyl methacrylate plastic material of the thermoplastic type such as, for example, commercial "Plexiglas" or "Lucite." The boundry surfaces of panel 12, including the major front, back and outer edge surfaces are covered with a material having high specular reflectivity. This material may be polished-faced metal foil, polished metal sheets, evaporated metal deposited on the surfaces as a film, or oriented flake metallic pigmented coatings.

The polished metal material, hereinafter referred to as metal foil, on the upper surface, the surface nearest to the viewer, is indicated at 13a, that on the back or lower surface is indicated at 13b, and that on the edges as 13c. Translucent coatings or laminations 14a, 14b and 14c, preferably white, are placed over the metal foil, while opaque coatings 15a, 15b and 15c, preferably black are superimposed on the translucent coatings. As shown in the drawing, except for certain openings as pointed out hereinafter, the light-transmitting panel is enveloped first by the metallic reflective laminations, then by the translucent laminations and then by the opaque laminations. Thus light is conserved and the metallic laminations are sealed against corrosion. Surface 16, formed by an opening in the transparent panel, admits light into the panel from a lamp 17 and is not coated. While but one of such lamps is shown, a plurality of such lamps, depending upon the size and use of the panel, may be suitably placed within openings in the panel. If desired, a filter cap, not shown, to provide only red light energy may be placed over the lamp 17.

As shown in Fig. 1, an indicium, indicated generally by reference numeral 18, is provided in the upper or obverse surface of the panel. Any number of such indicia, depending upon the need, may be used. The indicium is formed by providing an opening of predetermined size and shape in metallic reflective lamination 13a, then the translucent lamination 14a is applied with an integral portion thereof fitting in the opening in direct optical contact with the upper face of the light-transmitting panel 12, then the opaque lamination 15a is applied, preferably with an opening therein of smaller size than the opening in the metallic lamination 13a. In other words, the area of optical contact of the translucent lamination with the light-transmitting panel is preferably larger than the area of the opening in the opaque lamination, with the result that brightness of the marking is enhanced.

In accordance with this invention, behind the indicia 18, there is provided a re-entrant groove or depression 12b in the rear surface of the light-transmitting panel 12, and into this depression is placed first the metallic lamination 13b, then the translucent lamination 14b and then the opaque lamination 15b. Indicia 18 therefore is illuminated by light related to two separate optical phenomena: first, by the light which enters the translucent indicia due to its optical contact with the panel; and second, the light which is reflected into the indicia by the simple geometrical principle of a properly oriented mirrored surface. This structure is useful as well as practical in that by its use one may withhold, provide or greatly accentuate supplementary illumination arising from the re-entrant, geometrical surfaces and thus selectively exercise a large degree of control over the brightness of all indicia on the panel.

Referring still to Fig. 1 of the drawing, an expansion of the employment of mirrored geometrical surfaces to illuminate a knob element 21 external to the panel structure proper is shown by the passage of light rays which strike a stepped conical or prismatic surface 20 which also is provided with a reflective metallic coating 20b. The coating 20b may if desired be covered first by a translucent lamination and then by an opaque lamination. Here the light rays are reflected without significant diffusion into a transparent or translucent body 22, which in the interest of further conservation of light is provided with a reflective metallic coating 23 and further with an opaque black external finish 24. An opening 25 and an extended index 26 are illuminated by light distributed throughout the knob.

As shown in Fig. 1, the reflective metallic lamination 13a and the opaque lamination 15a on the obverse surface of the light-transmitting panel 12 are each provided with an opening therein immediately beneath the transparent, or as desired, translucent body 22 of knob 21, thus exposing an area of the light-transmitting panel to the lower or exposed area of body 22 of the knob, which exposed areas are separated by an air space. Also, as shown in Fig. 1, an area of the translucent lamination 14a is placed in optical contact with a portion of the otherwise exposed area of the light-transmitting panel directly beneath the periphery of the knob, thus enhancing the illumination of the knob at this locality and sealing the otherwise exposed surface of the metallic lamination 13a.

Figure 2:
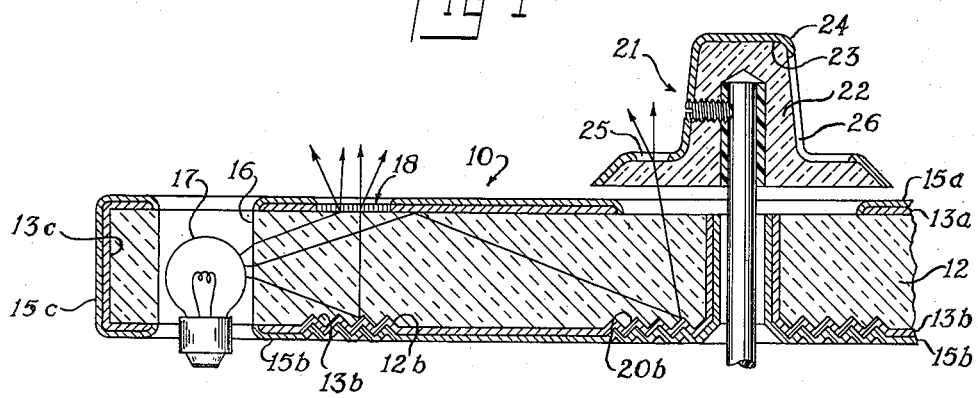
Fig. 2 is a fragmentary section similar to Fig. 1, illustrating a second embodiment of the invention.

The modification of the invention illustrated in Fig. 2 embodies the same general principle as that illustrated in Fig. 1, but discloses the use of simplified geometrical shapes 12b and 20b lying generally within the plane of the rear surface of the light-transmitting panel 12, and covered first by metallic lamination 13b and then by opaque lamination 15b, resulting in simplification, convenience, and improved ease of manufacture and application. In this embodiment, the translucent lamination has been omitted and the indicia 18 comprises a translucent insert placed in optical contact with the obverse surface of light-transmitting panel 12 through an opening in the metallic coating 13a. Also in Fig. 2, the knob 21 is composed of a hollow, stamped-metal blank having a high reflective, specular finish 23 on its inner surface and a blackened opaque outer surface 24. The space between the stamped knob body and its shaft bushing is filled with a suitable transparent or translucent plastic 22, which may be molded or cast into place.

Figure 3:
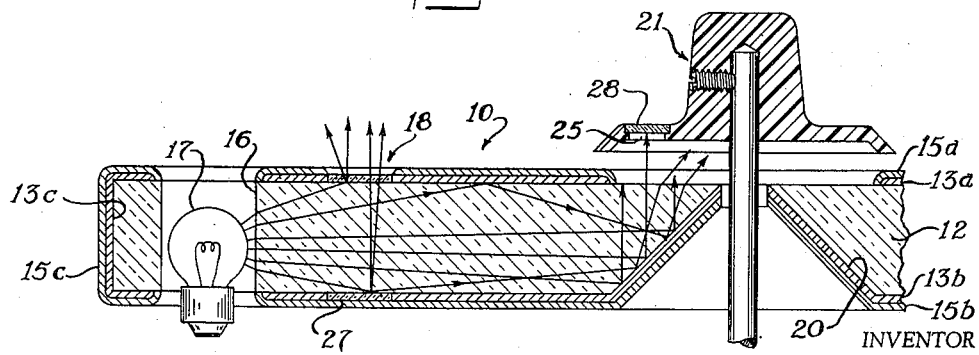
Fig. 3 is a fragmentary section similar to Fig. 1, illustrating a third embodiment of the invention.

In the embodiment of the invention illustrated in Fig. 3, the translucent lamination is again omitted and the indicia 18 comprises a translucent insert placed in optical contact with obverse face of light-transmitting panel 12 through an opening in the metallic lamination 13a. A corresponding opening in metallic lamination 13b permits optical contact of a diffusely reflective insert 27, which contributes diffused rear illumination to indicia 18. It will be noted that the illumination of indicia 18 in Fig. 3 is in actuality a combination of effects and is due in part to the impingement of light rays directly on the interface between the indicia and the light-transmitting panel, and in part to diffusely reflected light from the insert 27.

Referring still to Fig. 3, there is shown, further a bundle of light rays which do not strike either specular reflective laminations 13a or 13b but proceed directly to a smooth conical or pyramidal surface 20 at the center of the panel to be reflected thereby to illuminate markings on a knob 21. In this instance the knob is shown as an opaque solid having one or more open apertures 25 into which are inserted rear illuminable translucent plastic inserts 28.

Figure 4:
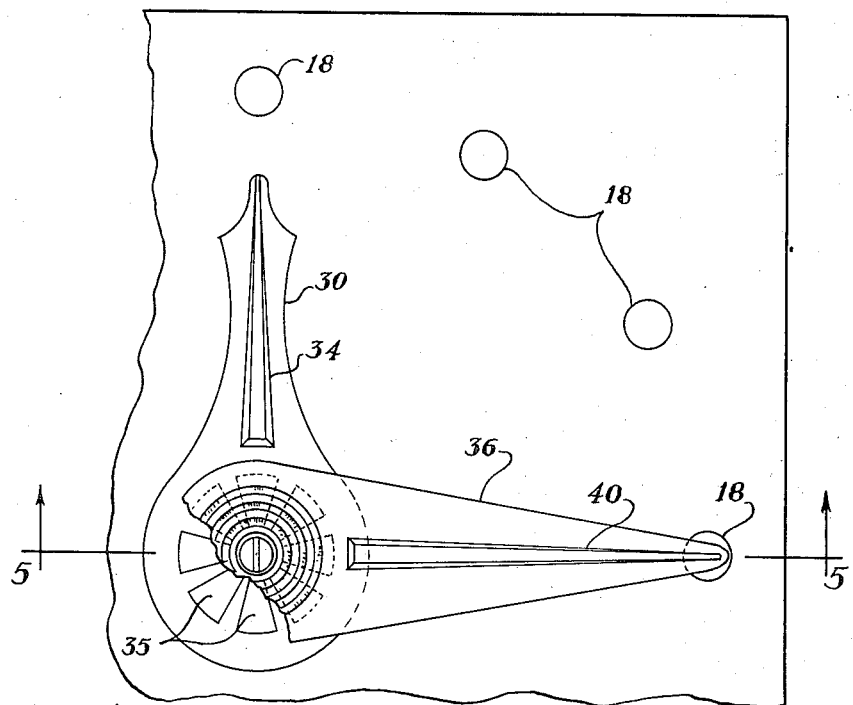
Fig. 4 is a partial plan view of an illuminated dial and pointer system embodying the invention.
Figure 5:
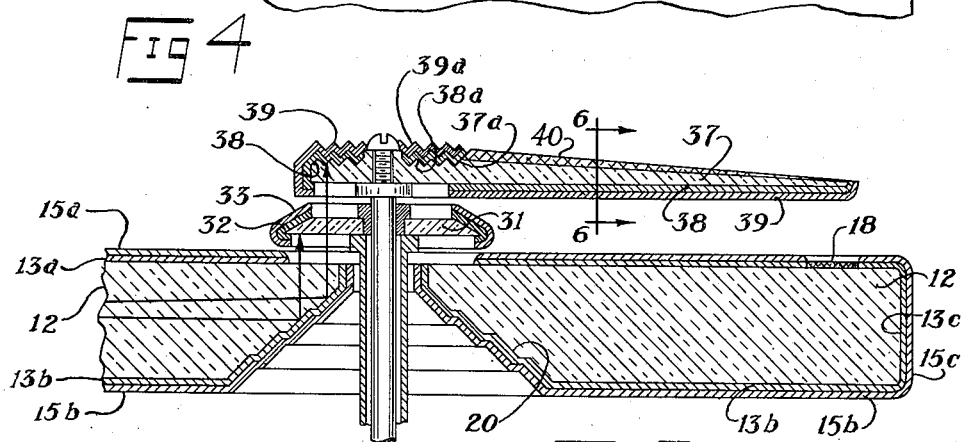
Fig. 5 is a section taken in the plane of line 5—5 of Fig. 4.
Figure 6:
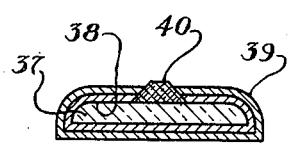
Fig. 6 is a section taken in the plane of line 6—6 of Fig. 5.

In Figs. 4 and 5 there is shown a dial and pointer arrangement which variously incorporates desirable features of the structures illustrated in Figs. 1, 2 and 3. That is, the light-transmitting panel 12, metallic laminations 13a, 13b and 13c, opaque laminations 15a, 15b and 15c and the indicia 18 are generally similar to like structures of Figs. 2 and 3, while the stepped conical or prismatic surface 20 is similar to that of Fig. 1. Here again use is being made of the principle of selectively oriented mirrored geometrical surfaces to redirect light rays along predetermined paths. Here the panel 10 may be the face or dial of a clock, the indicia 18 the numerals, the pointer 30 the hour hand and the pointer 36 the minute hand.

The pointer or hour hand 30 includes a transparent, light-transmitting panel 31, encased, except at the hub portion in a specular reflective metallic coating 32 over which is applied an opaque coating 33. A raised illuminated rib 34, preferably of white translucent plastic, is inserted through slots in the opaque and metallic laminations and is placed in optical contact with the obverse surface of the light-transmitting panel 31. So that light rays, as shown in Fig. 5, may pass through the hub of hour hand 30 to the hub of minute hand 36, open sectors 35 are provided in the laminations 32 and 33.

The minute hand 36 includes a transparent light-transmitting panel 37, encased, except for the lower surface of the hub, in specular reflective metallic coating 38 over which is applied an opaque coating 39. The upper surface of the hub portion of panel 37, metallic coating 38 and opaque coating 39 are formed of geometrical shapes 37a, 38a and 39a, respectively. A raised illuminated rib 40, which may be an integral part of the transparent panel 37 or which may be a separate translucent piece, inserted through slots in the opaque and metallic laminations and placed in optical contact with the obverse surface of the transparent panel, is provided on the upper surface of the hour hand.

The obverse coating of both the hour and minute hands may be of any desired color, such as, opaque black, white or red or the like for daylight contrast and still be illuminated in selected areas, the raised rib areas, at night. Thus, there is provided a highly satisfactory dial and pointer arrangement for both day and night use.

Without further description it is thought that the novel features and advantages of the invention will be readily apparent to those skilled in the art to which the invention appertains, and it will, of course, be understood changes in form, proportions, minor details of construction and interchanging of various structures may be resorted to without departing from the spirit of the invention and scope of the claims.

What is claimed is:

1. An illumination system comprising a light-transmitting member of transparent material having first laminations of high specular reflectance material bonded in optical contact with both front and back surfaces of said member, second laminations of opaque material superimposed on said first laminations on the front and back faces of said member, the first lamination having openings therein for the transmission of light therethrough from the front surface of said member, indicia forming means in said openings in optical contact with the front surface of said light-transmitting member, means formed on the first lamination on the back surface of said light-transmitting member in line with the indicia forming means on the front surface of said member for intercepting light rays passing through said member and reflecting such light rays to said indicia.

2. An illumination system as set forth in claim 1 wherein a third lamination of translucent material is sandwiched between the first and second laminations on the front surface of said light-transmitting member and wherein said indicia forming means includes an integral portion of said third lamination placed in optical contact with the front surface of the light-transmitting panel.

3. An illumination system as set forth in claim 1 wherein the indicia forming means includes an insert of translucent material placed in optical contact with the front surface of the light-transmitting panel.

4. An illumination system as set forth in claim 1 wherein the light-intercepting means on the back surface of the light-transmitting member includes a geometric depression formed within the back surface of the light-transmitting member and of the specular reflective lamination optically bonded thereto.

5. An illuminating system as set forth in claim 1 wherein the light-intercepting means on the back surface of the light-transmitting member includes a plurality of geometric depressions formed substantially in the plane of the back surface of the light-transmitting member and in the specular reflective lamination optically bonded thereto.

6. An illumination system as set forth in claim 1 wherein the light-intercepting means on the back surface of the light-transmitting member includes a diffuse reflectance member located within an opening in the specular reflective lamination on said back surface and placed in optical contact with such surface.

7. An illumination system as set forth in claim 1 wherein the indicia forming means includes a translucent lamination placed in optical contact with the front surface of the light-transmitting member through an opening in the specular reflectance lamination on said front surface, and wherein the light-intercepting means on the back surface of said member includes a geometric depression formed in such back surface and in the specular reflectance lamination optically bonded thereto.

8. An illumination system as set forth in claim 1 wherein the indicia forming means on the front surface of the light-transmitting member includes a translucent insert placed in optical contact with such front surface through an opening in the specular reflective lamination optically bonded to such surface, and wherein said light-intercepting means on the back surface of such member includes a diffuse reflectance insert placed in optical contact with such back surface through an opening in the specular reflective lamination optically bonded to such back surface.

9. An illumination system comprising a light-transmitting member of transparent material having front and rear surfaces, a lamination of specular reflectance material optical bonded to each of such surfaces, a source of light positioned relative to said member for transmission of light rays thereto, said source of light, said light-transmitting member and said specular reflectance laminations being so constructed and arranged as to transmit a first group of said light rays through said light-transmitting member by specular reflectance between said laminations and a second group of said light rays by substantially direct transmission through said member, and means associated with said light-transmitting member for intercepting said light rays and emitting such rays from the front surface of said member.

10. An illuminating system as set forth in claim 9 wherein the light-intercepting means includes a geometric depression formed in the rear surface of said light-transmitting member and in the lamination of specular reflectance material optically bonded thereto.

11. An illumination system as set forth in claim 9 wherein the light-intercepting means includes means formed on the rear surface of said light-transmitting member and in the lamination optically bonded thereto for intercepting said first group of light rays and reflecting said rays to indicia forming means on the front surface of said member, and a second geometric depression formed in the rear surface of said light-transmitting member and in the lamination optically bonded thereto for intercepting said second group of light rays and reflecting said rays to and through the front surface of said light-transmitting member.

12. An illumination system as set forth in claim 11 which includes a structure mounted in front of the front surface of said light-transmitting member in spaced relation thereto for illumination by said second group of light rays.

13. An illumination system as set forth in claim 12 wherein said structure includes a control knob having indicia formed thereon for illumination by said second group of light rays.

14. An illumination system as set forth in claim 12 wherein said structure includes a light-transmitting pointer for receiving and transmitting said second group of light rays.

15. An illumination system as set forth in claim 12 wherein said structure includes an hour and a minute hand of a clock with hub portions thereof mounted in superposed relation one to the other for receiving said second group of light rays and wherein said indicia includes numerals of said clock illuminated by said first group of light rays.

16. An illumination system comprising a light-transmitting member of transparent material having a lamination of high specular reflectance material in optical contact with both front and back faces thereof, a light source for directing light rays into said member for transmission therethrough, a first group of said light rays being transmitted through said member by specular reflectance between said laminations and a second group of said light rays being transmitted through said member substantially in the principal plane thereof, a first marking on the front surface of said light-transmitting member in optical contact with said front surface for illumination by said first group of light rays, a second marking mounted in juxtaposed relation to said front surface and spaced therefrom by an air gap for illumination by said second group of light rays, and means formed on the rear surface of said member and on the lamination optically bonded thereto for intercepting said first and second groups of light rays and reflecting such rays to said first and second markings, respectively.

17. An illumination system as set forth in claim 16 wherein the light-intercepting means on the rear surface of said light-transmitting member includes geometric surfaces formed in said rear surfaces in line with said first and second markings.

18. An illumination system as set forth in claim 17 which includes a knob mounted in juxtaposed relation to the front surface of said light-transmitting member and wherein said second markings are carried by said knob.

19. An illumination system as set forth in claim 17 which includes a pair of pointers mounted in juxtaposed relation to the front surface of said light-transmitting member and wherein said second markings are carried by said pointers.

References Cited in the file of this patent

UNITED STATES PATENTS

| | | |
|---|---|---|
| 2,566,026 | Hughes | Aug. 28, 1951 |
| 2,664,848 | Nauth | Jan. 5, 1954 |
| 2,696,550 | Neugass | Dec. 7, 1954 |